(12) United States Patent
Jenkins et al.

(10) Patent No.: US 7,558,481 B2
(45) Date of Patent: Jul. 7, 2009

(54) METHOD FOR OPTIMIZING ENHANCED DWDM NETWORKS

(75) Inventors: David W. Jenkins, North Aurora, IL (US); Gilbert A. Buescher, III, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 731 days.

(21) Appl. No.: 11/041,524

(22) Filed: Jan. 24, 2005

(65) Prior Publication Data

US 2006/0165414 A1 Jul. 27, 2006

(51) Int. Cl.
*H04J 14/02* (2006.01)

(52) U.S. Cl. .............................. 398/79; 398/83; 398/59; 398/75; 398/98; 398/100; 370/397; 370/351; 370/409; 370/386; 370/401; 709/208; 385/24; 385/37

(58) Field of Classification Search ............... 398/59, 398/79, 67, 66, 68, 69, 100, 70, 71, 72, 75, 398/76, 98, 25, 28, 83; 370/397, 351, 409, 370/386, 401; 709/208; 385/24, 37
See application file for complete search history.

(56) References Cited

U.S. PATENT DOCUMENTS

| 6,449,069 | B1 * | 9/2002 | Fujita | 398/43 |
|---|---|---|---|---|
| 6,810,215 | B1 * | 10/2004 | Oikawa | 398/175 |
| 7,315,695 | B2 * | 1/2008 | Chang et al. | 398/67 |
| 2002/0196490 | A1 * | 12/2002 | Smith | 359/118 |
| 2003/0093485 | A1 * | 5/2003 | Dougall et al. | 709/208 |
| 2004/0208587 | A1 * | 10/2004 | Chang et al. | 398/100 |

\* cited by examiner

*Primary Examiner*—Hanh Phan
(74) *Attorney, Agent, or Firm*—Hamilton, Brook, Smith & Reynolds, P.C.

(57) ABSTRACT

An enhanced Dense Wave Division Multiplexing (DWDM) network is optimized through bundling subchannel traffic in DWDM channels at network nodes and "hubbing" the DWDM channels at nodes receiving a relatively higher volume of aggregate traffic than other nodes. The optimization can eliminate low rate links and supporting network equipment. The bundling and hubbing may also be used independently from one another. The DWDM network may be enhanced with SONET, SDH, Ethernet, ATM, or other technology. The DWDM network may be a BLSR, UPSR, point-to-point, mesh, or other network configuration.

22 Claims, 5 Drawing Sheets

METHOD FOR OPTIMIZING ENHANCED DWDM NETWORKS

BACKGROUND OF THE INVENTION

Optical Networks, such as Synchronous Optical Network (SONET), provide high-speed network communications between network nodes, such as central offices. There are many optimization techniques applied to SONET for packing lower speed traffic streams (e.g., OC-3 or OC-12) into higher speed stream(s) (e.g., OC-48, OC-192). As a result, optical fibers in high traffic volume areas are densely packed.

Dense Wave Division Multiplexing (DWDM) channels are generally used to provide high speed communications over long haul links in an optical network. A DWDM channel can support many SONET channels. For example, thirty-two OC-48 SONET channels may be communicated over a single DWDM channel.

SUMMARY OF THE INVENTION

The principles of the present invention provide for a method, and corresponding apparatus, of optimizing enhanced Dense Wave Division Multiplexing (DWDM) networks. A method includes bundling subchannel traffic from a first node (e.g., central office) to a second node (e.g., another central office) in a DWDM channel if the subchannel traffic is above a first threshold. If aggregate traffic in DWDM channels received by the second node is below a second threshold, the method includes routing the DWDM channels from the second node to a third node (e.g., yet another central office acting as a hub) receiving more aggregate traffic in DWDM channels than the second node. The DWDM networks may be enhanced with Synchronous Optical Network (SONET) technology, Synchronous Digital Hierachy (SDH) technology, Ethernet technology, Asynchronous Transfer Mode (ATM) technology, and so forth. In some embodiments, (i) bundling subchannel traffic from the first node to the second node and (ii) routing the DWDM channels to the third node may be applied to the network nodes independent of one another.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Recently, Dense Wave Division Multiplexing (DWDM) has added Add/Drop Multiplexing (ADM) functionality. The addition of ADM functionality allows DWDM equipment to be used in Central Offices (CO's) in addition to end-points of long haul network paths in which DWDM was predominantly used. While there is presently a significant amount of optimization associated with Synchronous Optical Network (SONET) communications that traditionally use ADM functionality, there is much less optimization that has occurred on the DWDM level. The description below illustrates embodiments of methods and corresponding apparatae of optimizing network communications at the DWDM level.

Figure 1:
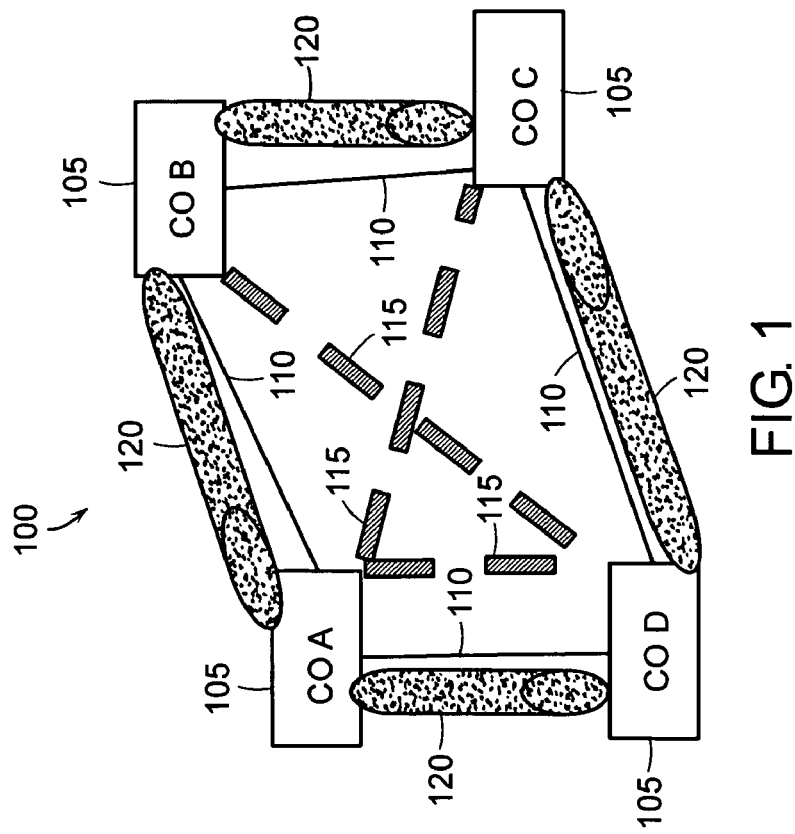
FIG. 1 is a network diagram in which a first process according to the principles of the present invention is depicted.

FIG. 1 is a network diagram of an example network 100 in which the principles of the present invention may be deployed. The network 100 includes four nodes 105, which are central offices 105 in some networks, including CO_A, CO_B, CO_C, and CO_D but may be other forms of nodes in other networks. The network 100 is described herein in reference to an enhanced DWDM network that has a channel supporting multiple subchannels. The enhanced DWDM network may be enhanced with any of multiple technologies, such as Synchronous Optical Network (SONET) technology, Synchronous Digital Hierarchy (SDH) technology, Ethernet technology, Asynchronous Transfer Mode (ATM) technology, and so forth. It should be understood that the enhanced DWDM or enhancing technologies may be other communications protocols in other embodiments.

The central offices 105 are physically connected by fiber optic links 110. The fiber optic links 110 carry optical signals (not shown) that support demands 115 indicated by dashed lines. A SONET channel, which supports the demands 115, may be configured with multiple Time Division Multiplexing (TDM) slots. For example, an OC-48 channel is typically configured with 24 working slots and 24 protection slots in a Bi-directional Line Switched Ring (BLSR) network configuration. Each slot supports a demand 115 by carrying information (i.e., network traffic) being passed from a source node to a destination node defined by the respective demand 115, possibly through one or more via node(s). Add/Drop Multiplexers (ADMs) (not shown) add, drop, or pass-through network traffic of the demands in the SONET channel in at least a subset of the central offices 105.

Some algorithms handling SONET traffic pack fiber optical links 110 well. Packing the fiber optical links 110 well works in networks having highly distributed traffic and has traditionally resulted in lowest cost networks. If the traffic is highly distributed, an ADM at every central office 105 leads to a cost efficient network. If there is not enough traffic, not every central office 105 needs an ADM, and therefore, the cost efficiency of the network is not optimal.

Dense Wave Division Multiplexing (DWDM) equipment was used until recently to augment the fiber capacity of SONET networks. With the emergence of DWDM equipment enhanced with SONET technology (or the other example technologies listed above), the prior approaches are no longer optimal. The principles of the present invention employ a process or corresponding apparatus that more efficiently routes large amounts of network traffic using a SONET/TDM protocol, for example, in an enhanced DWDM network. Such a process (or corresponding apparatus) utilizes ADMs well instead of trying to pack fiber optic links well, although, as will be described below, the process can pack the fiber optic links well in addition to utilizing the ADMs well.

In one embodiment, the process hubs small traffic demands with larger demands and bundles large traffic demands between two points into point-to-point circuits before routing. The routing processes and tools used for SONET or other network technology design are utilized with the following preprocessing for the demand data:

1. a first cutoff fill factor (c1) for packing the traffic is established. The first cutoff fill factor can be a fraction of a wavelength line rate. The value of the cutoff first cutoff fill factor may be a variable that can be optimized.

2. a second cutoff fill factor (c2) for packing the traffic is established. The second cutoff fill factor can be a fraction (possibly greater than 1) of the wavelength line rate. The value of the second cutoff fill factor is a variable that can be optimized.

3. The volume of traffic from each central office 105 is determined in aggregate and listed per destination central office 105. In other embodiments, the listing may be by originating central office 105.

4. All traffic that is sent from one central office 105 to another central office 105 is bundled in complete wavelengths if the traffic volume is greater than the fraction of the wavelength volume determined by the first cutoff fill factor.

5. CO's 105 with aggregate demand less than c2 have their traffic hubbed. All traffic from these CO's 105 are transported to a hub, which is chosen by a designer or through automated optimization, which may result in demands being transported between central offices 105 in segments.

6. The traffic from this adjusted demands profile is used in state of the art SONET or other network protocol design tools.

Continuing to refer to FIG. 1, above a threshold of traffic volume, the central offices 105 bundle the traffic types (e.g., SONET, STS-1, and so forth) in an aggregate stream 120, which may be a DWDM stream, and allocate a larger block of traffic (subrate or full rate) between source and destination of the aggregate stream. FIG. 1 represents step 4 of the process listed above.

Figure 2:
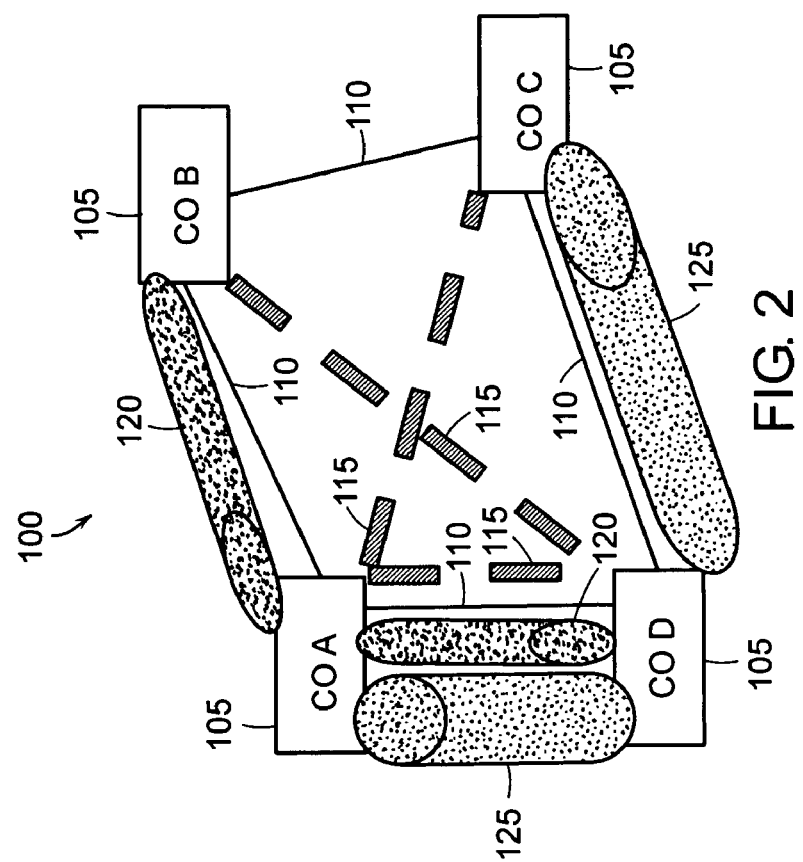
FIG. 2 is the network diagram of FIG. 1 in which a second process according to the principles of the present invention is depicted.

FIG. 2 is the network diagram of FIG. 1 illustrating step 5 of the process listed above, namely, below a threshold of traffic volume, the traffic is routed from specified offices to a hub. In this case, the specified offices are CO_B and CO_D, and the hub is CO_A. In other words, the traffic from CO_B and CO_D have aggregate demands in streams 120 less than the second cutoff fill factor c2, so their traffic is hubbed to CO_A. CO_A then transmits the aggregate traffic through a higher volume stream 125, which spans from CO_A to CO_C via CO_D. Thus, lower volume streams 120 can be aggregated to a hub, CO_A, and transmitted via a higher volume stream 125 to a destination, in this case CO_C.

Through use of the process according to the principles of the present invention, the network configuration of FIG. 2 as compared to the network configuration of FIG. 1 has a reduction in the number of lower rate communications paths. Specifically, if all of the lower rate communications paths in FIGS. 1 and 2 are OC-48, there are two fewer OC-48 communications paths needed in the network of FIG. 2 with the process of hubbing. There are two higher rate (e.g., DWDM) communications paths in the network. Thus, it should be understood that less network equipment can be used to achieve at least the same results in network communications speed since lower speed streams between CO_B and CO_C and between CO_D and CO_C are not required.

In practice, these steps may be applied to a network through use of commercial or custom software executed off-line (e.g., desktop computer) or in-line (i.e., on hardware providing network traffic communications service, such as a processor in an ADM). Parameters, such as the first and second cutoff fill factors, number of channels, number of fibers, number of available central offices, traffic demands between specified central offices 105, or other parameters, may be provided to the software to determine the paths of the lower volume streams 120 and higher volume streams 125. Off-line software can be executed on any suitable computer or processor, and in-line software can be executed in a network processor, such as: a network node, Add/Drop Multiplexer, or other network communications device. The method may also be added as a standard network process in, for example, General Multiprotocol Label Switching (GMPLS), which can be accessed by central offices 105, other network nodes, or processors within ADMs for automatic network path configuration. According to the principles of the present invention, a process, corresponding apparatus, or network operator may access a centralized or distributed database (not shown), located for example in a central office 105 or other network node, containing the information listed above to be used as parameters to automatically configure, semi-automatically configure, or manually configure the network traffic communications paths as describe herein.

Figure 3A:
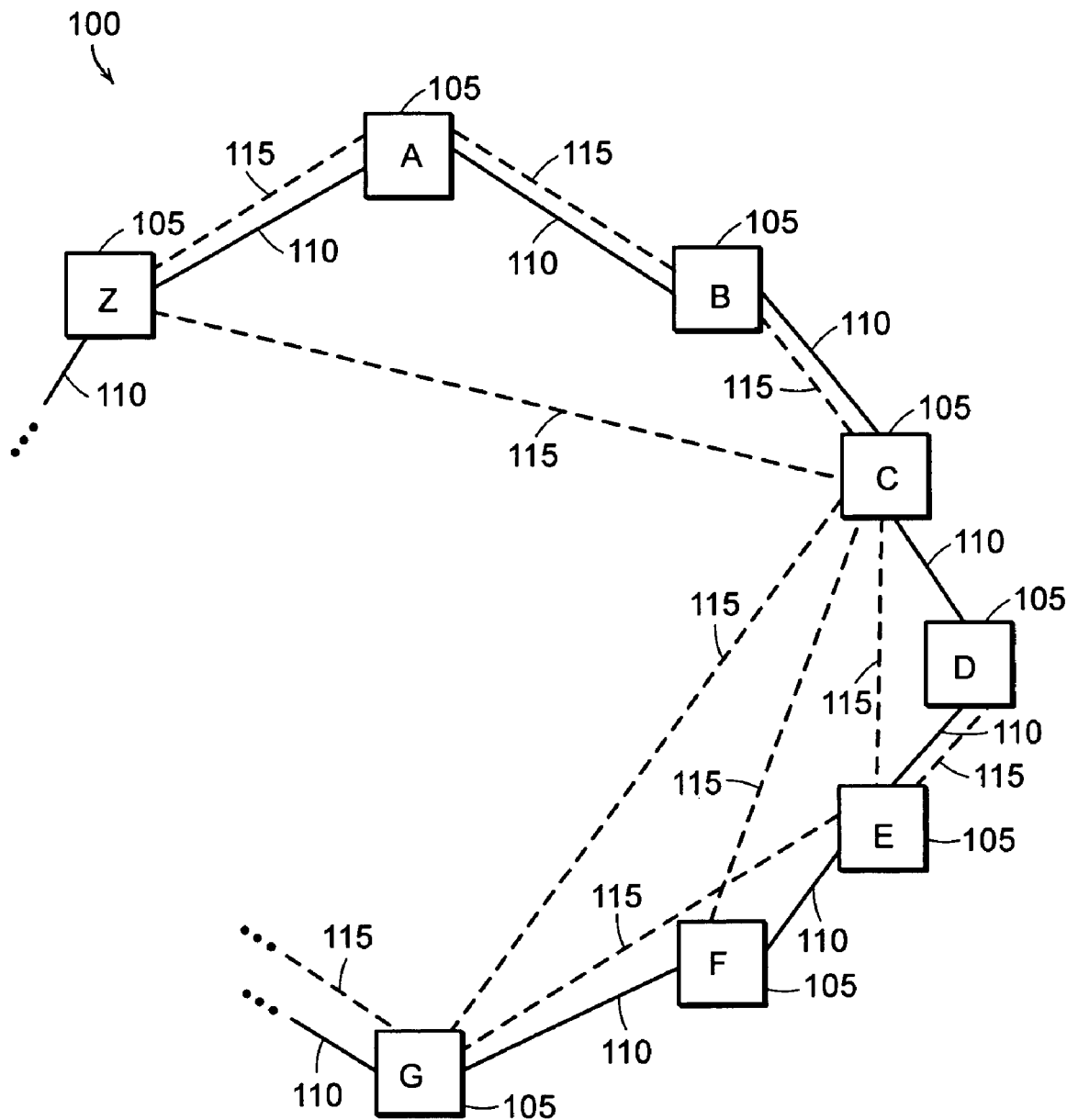
FIG. 3A is a larger network diagram in which the processes of FIGS. 1 or 2 or both are employed.

FIG. 3A is a more complex example of the network 100 of FIGS. 1 and 2. In the network 100 of FIG. 3A, there are twenty-six central offices 105 (A-Z) with optical links 110 providing communications paths. Demands 115, such as SONET demands, are illustrated in dashed lines. As can be seen, the demands 115 are not necessarily between consecutive nodes.

Figure 3B:
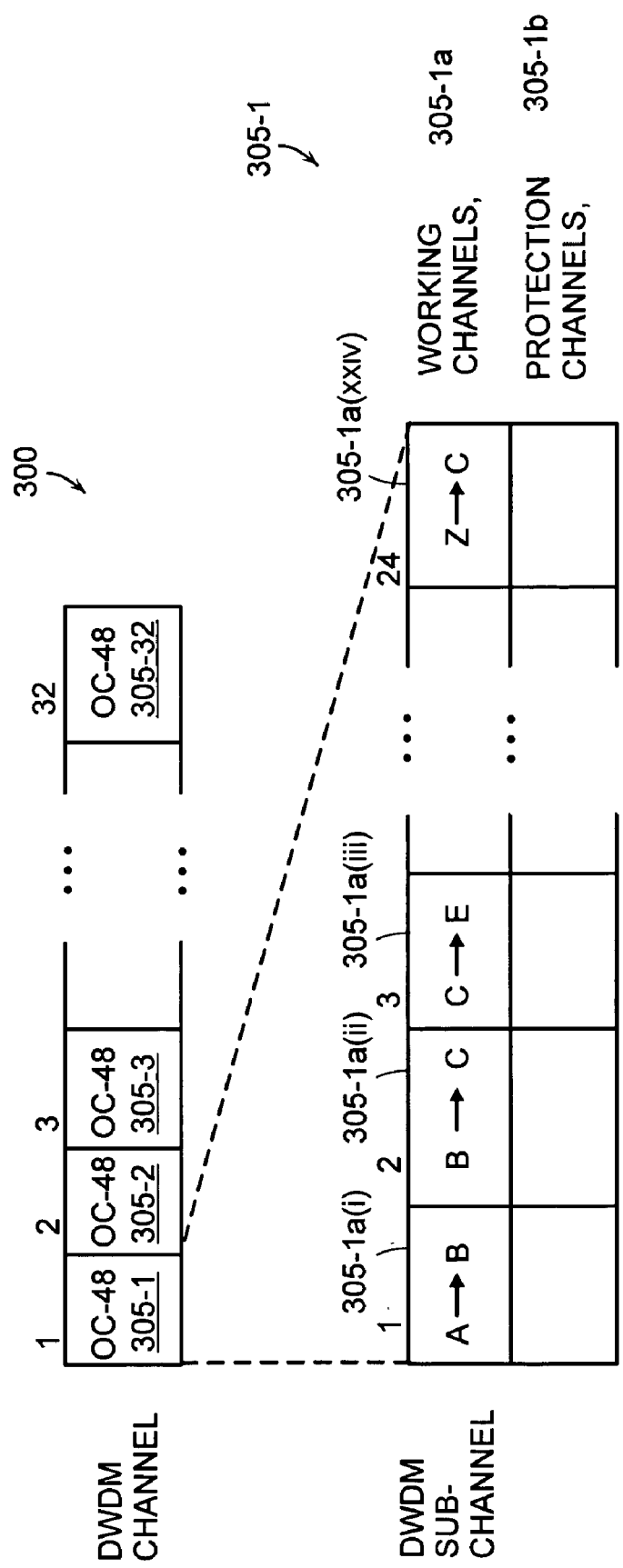
FIG. 3B is a diagram of an example communications channel and subchannels on which the processes of FIGS. 1 and 2 operate.

FIG. 3B is a channel diagram of an example communications protocol (i.e., DWDM) that may be supported by the principles of the present invention. Specifically, the channel diagram represents a DWDM channel 300 having thirty-two channels, which are individual wavelengths. Each of the thirty-two channels, in one embodiment, includes an OC-48 subchannel 305-1, 305-2, 305-3, . . . , 305-32.

A DWDM subchannel 305-1 includes working channels 305-1a and protection channels 305-1b. The working channels 305-1a support a subset of the demands 115 in the network of FIG. 3A by having timeslots, packets, or cells designated to support communications traffic between the nodes 105 defining the demands 115. For example, the first time slot 305-1a(i) includes traffic for the demand from CO_A to CO_B; the second time slot 305-1a(ii) includes traffic for the demand from CO_B to CO_C; the third time slot 305-1a(iii) includes traffic for the demand from CO_C to CO_E; . . . ; the twenty-fourth time slot 305-1 a(xxiv) includes traffic for the demand from CO_Z to CO_C. It should be understood that the second subchannel 305-2 of the DWDM channel 300 may include traffic for other demands 115 in the network 100 that cannot fit into the first subchannel 305-1.

Figure 3C:
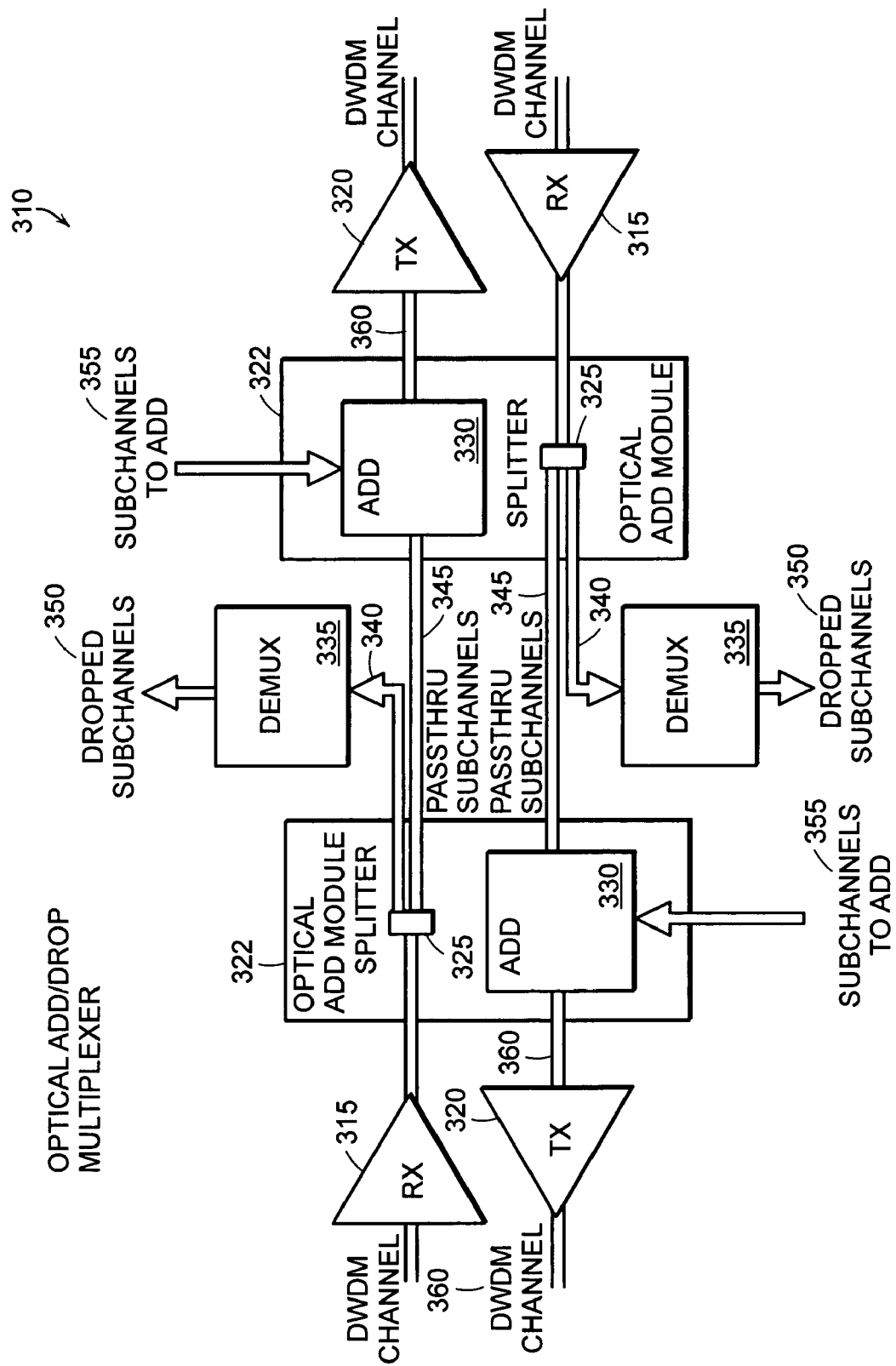
FIG. 3C is a schematic diagram of an optical Add/Drop Multiplexer (ADM) used in some nodes of the networks of FIGS. 1-3A.

FIG. 3C is a schematic diagram of an optical Add/Drop Multiplexer (ADM) 310 that may be employed in the central offices 105. In each direction, the ADM 310 includes a receiver 315 and transmitter 320. The ADM 310 includes two optical add modules 322. Each of the optical add modules 322 includes a splitter or switch 325 and an optical adder 330. The splitter or switch 325 splits or switches channels into dropped channels 340 and pass through channels 345. The dropped channels 340 are directed to a demultiplexer 335, which outputs demultiplexed dropped subchannels 350. The optical adders 330 combine the pass through channels 345 with subchannels to add 355. The optical adder 330 outputs the combined subchannels into a full rate channel 360, which the transmitter 320 amplifies and transmits to another central office 105.

Figure 4:
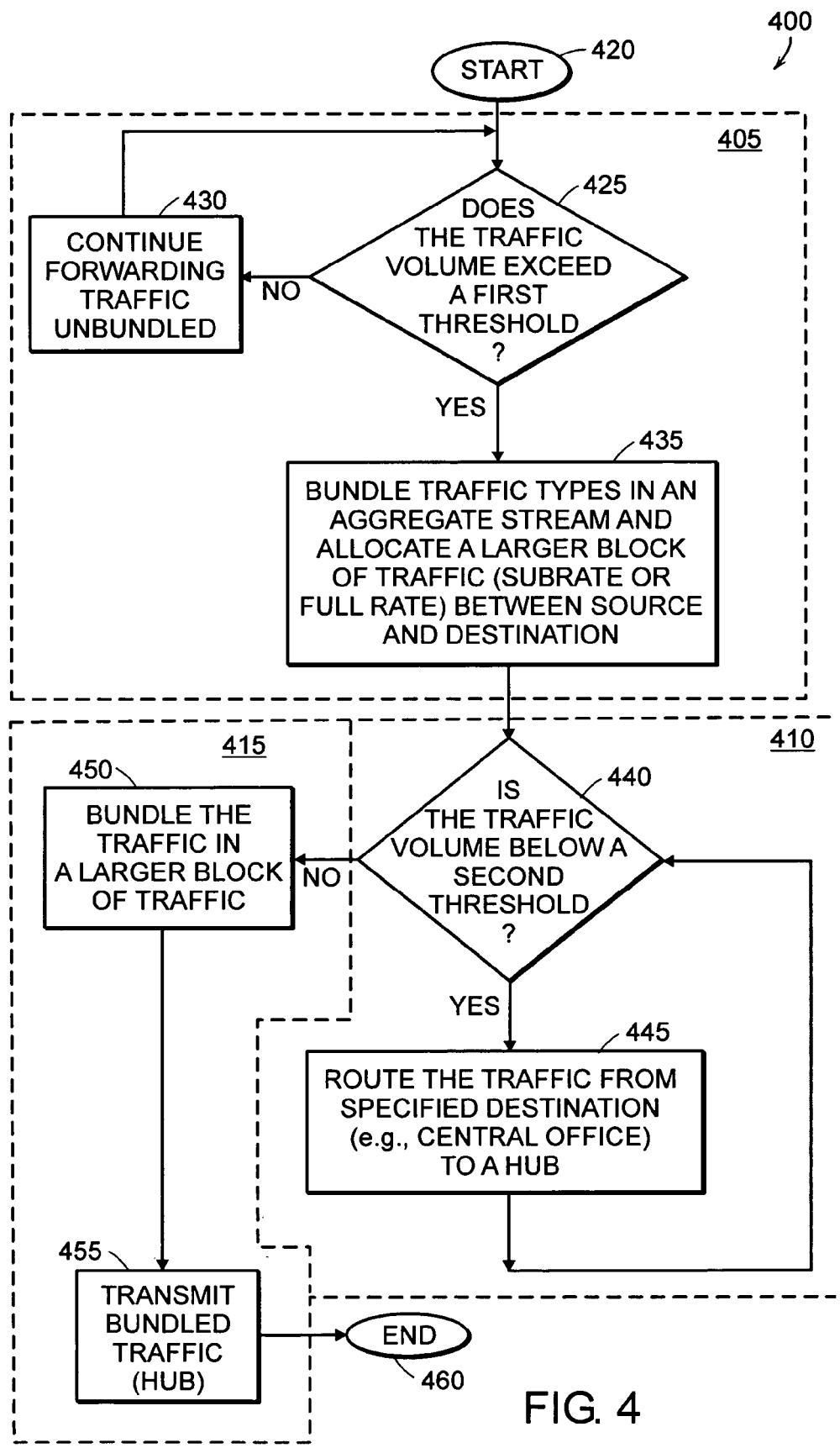
FIG. 4 is a flow diagram of the first and second processes illustrated in FIGS. 1 and 2.

FIG. 4 is a flow diagram of an example of a process 400 used to execute the principles of the present invention. The process 400 may be defined as having two (or more) subprocesses, as described above in reference to FIGS. 1 and 2. The first subprocess 405 performs the bundling portion of the process 400, and the second subprocess 410 performs routing to hubs, also referred to herein as "hubbing." The process 400 starts (step 420) and determines whether the traffic volume in the central office 105 in which the process 400/subprocess 405 is being executed exceeds a first threshold (step 425). If not, the process 400/subprocess 405 continues forwarding traffic unbundled (step 430). If the traffic volume exceeds the first threshold (step 425), the subprocess 405 bundles traffic types in an aggregate stream and allocates a larger block of traffic (subrate or full rate) between source and destination central offices (step 435).

The process 400 continues in the second subprocess 410 and determines whether the traffic volume is below a second threshold (step 440). If not, the subprocess 410 proceeds to an output subprocess 415. If the traffic volume is below the second threshold, the traffic is routed from the specified destination to a hub (step 445). If the subprocess 410 is operating at the hub (i.e., the traffic volume is above the second threshold (step 440)), the subprocess 410 naturally proceeds to the output subprocess 415.

The output subprocess 415 bundles traffic in a larger block of traffic (step 450), such as a DWDM stream containing thirty-two subchannels of OC-48. The output subprocess 415 transmits bundled traffic for transmitting to another hub (step 455), after which the process 400 ends (step 460) in this example embodiment. It should be understood that in operation, the process 400 typically does not actually end; the output subprocess 415 typically keeps bundling (step 450) and transmitting (step 455) as long as the hub is operational.

It should also be understood that various techniques may be used to improve the broad concepts described above. For example, bundling subchannel traffic may include applying SONET optimization techniques to fill one subchannel 305 in the DWDM channel 300 with the subchannel traffic. Routing the traffic of the DWDM channels from the second node (e.g., CO_B or CO_D in FIG. 2) to a third node (e.g., CO_A in FIG. 2) may include determining whether the third node is receiving aggregate traffic in the DWDM channels 300 above the second threshold (i.e., second cutoff fill factor). Also, routing the traffic of the DWDM channels 300 from the second node to a third node may include determining whether the third node is receiving aggregate traffic in DWDM channels 300 above a third threshold, which may be different from the second threshold. Determining the third node (i.e., hub) in the network may be done by conducting a manual or automatic search of network nodes 105 for the third node, or accessing an information server (not shown) to locate the third node. An information server may be connected to the central offices 105 via a maintenance channel using lower rate communications paths known in the art. It is assumed that in the case of an information server, the network nodes report traffic volume being handled by the respective nodes in an automated manner or in response to an inquiry.

The process 400 may also include forwarding subchannel traffic in the DWDM channels 300 from the second node to at least one other second node in a serial manner, adding subchannel traffic of each second node into a DWDM channel 300 at the respective second node, until the aggregate traffic in the DWDM channels exceeds the second threshold. The node at which the traffic in the DWDM channel 300 exceeds the second threshold is considered the third node, and higher rate communications are added and dropped at the third node.

The process 400 may employ optimization techniques that include combining subchannel traffic in the DWDM channels 300 into fewer DWDM channels 300. Combining subchannel traffic in the DWDM channels 300 into fewer DWDM channels 300 may be performed at the second node or at the third node.

It should be understood that the method or corresponding apparatus may be used in a Bi-directional Line Switched Ring (BLSR) network, Uni-directional Path Switched Ring (UPSR) network, point-to-point network, or a mesh network.

Although described above as applying to SONET enhanced Dense Wave Division Multiplexing (DWDM) networks, the method or corresponding apparatus applies equally well to Synchronous Digital Hierarchy (SDH) enhanced DWDM networks, Ethernet enhanced DWDM networks, or Asynchronous Transfer Mode (ATM) enhanced DWDM networks.

While this invention has been particularly shown and described with references to preferred embodiments thereof, it will be understood by those skilled in the art that various changes in form and details may be made therein without departing from the scope of the invention encompassed by the appended claims.

Although the process 400 is described as having two subprocesses 405 and 410, each subprocess may be employed independent of the other and achieve improved network performance and/or lower cost networks. In particular, bundling subchannel traffic in a DWDM channel 300 for forwarding from a first node to a second node if the subchannel traffic is above a first threshold may be done in some network nodes (i.e., central offices) without taking advantage of the second subprocess 410, namely, if aggregate traffic in DWDM channels received by the second node is below a second threshold, routing the subchannel traffic in the DWDM channels 400 from the second node to a third node receiving more aggregate traffic in DWDM channels 400 than the second node. Similarly, the second subprocess 410 (i.e., hubbing) may be deployed in the network nodes independent of the first subprocess 405 (i.e., bundling).

What is claimed is:

1. A method of flowing traffic through an enhanced Dense Wave Division Multiplexing (DWDM) network, the method comprising:
   bundling subchannel traffic in a DWDM channel to forward from a first node to a second node in a DWDM network if the subchannel traffic volume is above a first threshold; and
   if aggregate traffic volume in DWDM channels received by the second node is below a second threshold, routing the subchannel traffic in the DWDM channels from the second node to a third node in the DWDM network receiving more aggregate traffic in DWDM channels than the second node to flow the traffic through the DWDM network.

2. The method according to claim 1 wherein bundling subchannel traffic includes applying optimization techniques to fill subchannels in the DWDM channel with the subchannel traffic.

3. The method according to claim 1 wherein routing the traffic of the DWDM channels from the second node to a third node includes determining whether the third node is receiving aggregate traffic in DWDM channels above the second threshold.

4. The method according to claim 1 wherein routing the traffic of the DWDM channels from the second node to a third node includes determining whether the third node is receiving aggregate traffic in DWDM channels above a third threshold.

5. The method according to claim 1 further including conducting a search of network nodes for the third node.

6. The method according to claim 1 further including accessing an information server to locate the third node.

7. The method according to claim 1 further including forwarding subchannel traffic in the DWDM channels from the second node to at least one other second node in a serial manner, adding subchannel traffic of each second node into a DWDM channel at the respective second node, until the aggregate traffic in the DWDM channels exceeds the second threshold.

8. The method according to claim 1 further including combining subchannel traffic in the DWDM channels into fewer DWDM channels.

9. The method according to claim 8 wherein combining subchannel traffic in the DWDM channels into fewer DWDM channels is performed at the second node.

10. The method according to claim 8 wherein combining subchannel traffic in the DWDM channels into fewer DWDM channels is performed at the third node.

11. The method according to claim 1 wherein the DWDM network is enhanced with Synchronous Optical Network (SONET) technology, Synchronous Digital Hierarchy (SDH) technology, Ethernet technology, or Asynchronous Transfer Mode (ATM) technology.

12. The method according to claim 1 used in a Bi-directional Line Switched Ring (BLSR) network, Uni-directional Path Switched Ring (UPSR) network, point-to-point network, or a mesh network.

13. An enhanced DWDM network, comprising:
a first node bundling subchannel traffic in a DWDM channel if the subchannel traffic volume is above a first predetermined threshold; and
a second node that aggregates traffic in DWDM channels including the DWDM channel from the first node and, if aggregate traffic volume in the DWDM channels is below a second predetermined threshold, the second node routes the subchannel traffic in the DWDM channels to a third node receiving more aggregate traffic in DWDM channels than the second node.

14. The network according to claim 13 wherein the first node applies SONET optimization techniques to fill subchannels in the DWDM channel with the subchannel traffic.

15. The network apparatus according to claim 13 wherein the second node routes the DWDM channels to the third node if the third node is receiving aggregate traffic in DWDM channels above the second threshold.

16. The network apparatus according to claim 13 wherein the second node routes the DWDM channels to the third node if the third node is receiving aggregate traffic in DWDM channels above a third threshold.

17. The network apparatus according to claim 13 wherein the second node conducts a search of network nodes for the third node.

18. The network apparatus according to claim 13 further including an information server that stores information about aggregate traffic in DWDM channels being received by the network nodes, and wherein the second node accesses the information server to locate the third node.

19. The network apparatus according to claim 13 further including multiple second nodes, and wherein the second nodes route subchannel traffic in the DWDM channels from one to another in a serial manner, adding respective subchannel traffic into the DWDM channels, until the aggregate traffic in the DWDM channels exceeds the second threshold.

20. The network apparatus according to claim 13 wherein at least one of the nodes combines subchannel traffic in the DWDM channels into fewer DWDM channels.

21. The apparatus according to claim 13 wherein the DWDM network apparatus is enhanced with Synchronous Optical Network (SONET) technology, Synchronous Digital Hierarchy (SDH) technology, Ethernet technology, or Asynchronous Transfer Mode (ATM) technology.

22. The network apparatus according to claim 13 used in a BLSR network, UPSR network, point-to-point network, or mesh network.

* * * * *